JONES & PRENTICE.
Harvester Cutter.
No. 94,608. Patented Sept. 7, 1869.
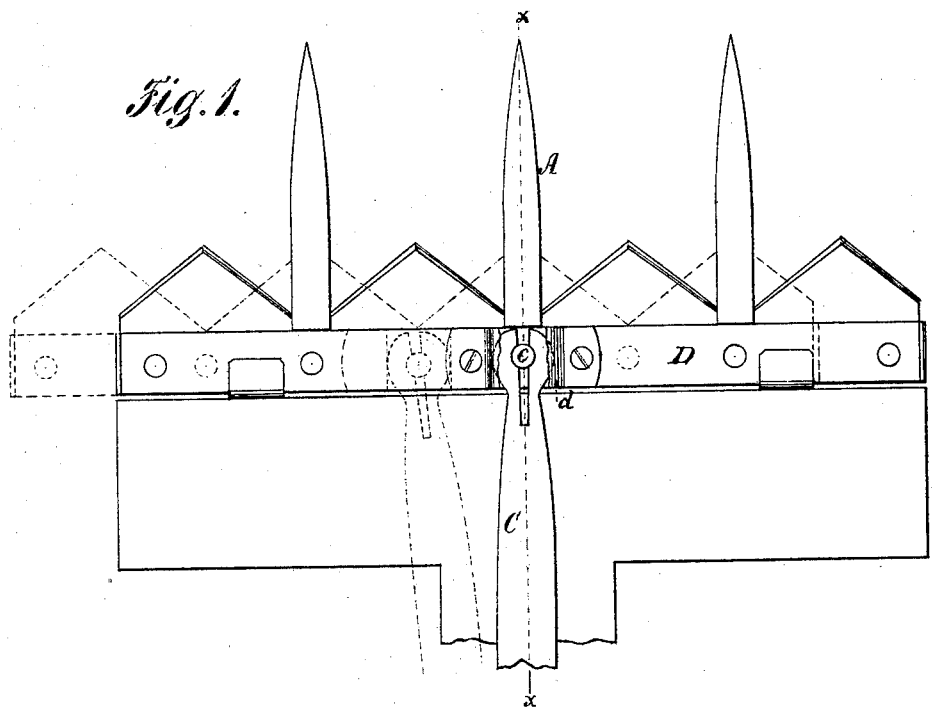
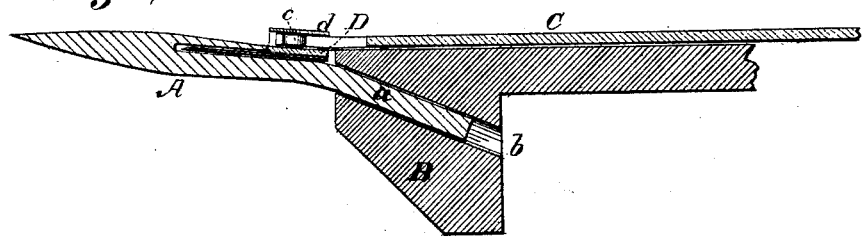

UNITED STATES PATENT OFFICE.

J. HERVA JONES AND MILES S. PRENTICE, OF ROCKFORD, ILLINOIS.

IMPROVEMENT IN HARVESTER-GUARDS.

Specification forming part of Letters Patent No. 94,608, dated September 7, 1869.

*To all whom it may concern:*

Be it known that we, J. HERVA JONES and MILES S. PRENTICE, both of Rockford, in the county of Winnebago and State of Illinois, have invented certain new and useful Improvements in Harvesters, of which the following is a full, clear, and exact description.

The object of the first part of our invention is firmly to secure the guards to the finger-beam, while permitting them readily to be removed or replaced; to which end our improvement consists in bending the shanks of the guards vertically at an angle, say, of about ten degrees to their normal plane, and driving them into holes in the finger-beam inclined at a corresponding angle.

The next part of our invention relates to the method of driving the cutters. Its object is to prevent the rattling of the driving-pitman or sway-bar in its socket; and the improvement consists in a pitman working in a loop-eye or socket on the cutter-bar, and having a soft-metal plug or wedge inserted in a split in the pitman-head or sway-bar, so that as the head works loose in its socket it may be tightened by expanding the plug.

In the accompanying drawings, which show such parts only as relate to our invention, Figure 1 is a plan; and Fig. 2, a transverse section, at the line *x x* of Fig. 1, through the cutting apparatus of a harvester.

The square shanks *a* of the guards A are bent, as shown in the drawings, and driven into the inclined holes *b* in the finger-beam B.

We prefer to bore these holes entirely through the finger-beam, as we are thus enabled readily to drive out the guards with a punch when required.

This mode of securing the guards is strong and very simple, as no bolts, nuts, or screws are required.

In this instance the cutters are driven by a sway-bar, acting on the cutter-bar near its center, as in the well-known Marsh harvester.

The sway-bar C works in an eye or loop, *d*, on the cutter-bar D.

The front end of the sway-bar is forked or slit, as shown in the drawings, and a plug or wedge, *c*, of soft iron or other soft metal, is inserted in it.

The rounded head of the sway-bar is simply inserted in the loop *d*, in which it works freely, but fits snugly.

If the head becomes loose in the loop, it is withdrawn and expanded by hammering on the plug *c*, and again inserted in the loop.

Practically this has proved a useful improvement on the keys heretofore used to secure the proper fit of the sway-bar head in its eye.

The sway-bar head is, by preference, made of malleable iron.

What we claim as our invention, and desire to secure by Letters Patent, is—

1. The guards secured to the finger-beam by bending the shanks of the guards downward at an angle of about ten degrees, and driving them into holes bored into the finger-beam at an angle of corresponding inclination, as set forth.

2. Also, the sway-bar constructed with a split head and an expansible plug, as set forth, to secure an accurate fit of the sway-bar head in the loop of the cutter-bar, as described.

In testimony whereof we have hereunto subscribed our names.

J. HERVA JONES.
    M. S. PRENTICE.

Witnesses:
 JOE I. PEYTON,
 JOHN J. CHEW.